United States Patent
Rodkey et al.

(10) Patent No.: US 7,773,729 B2
(45) Date of Patent: *Aug. 10, 2010

(54) DIGITAL NOTIFICATION AND RESPONSE SYSTEM WITH REAL TIME TRANSLATION AND ADVERTISING FEATURES

(75) Inventors: Ryan Scott Rodkey, Sugar Land, TX (US); John Frank Rodkey, Jr., Missouri City, TX (US); David Lynn Hickey, Rosharon, TX (US); Ronald F. Ramsey, St. Petersburg, FL (US); Darren Lynn Ross, Sugar Land, TX (US)

(73) Assignee: Techradium, Inc., Sugar Land, TX (US)

( * ) Notice: Subject to any disclaimer, the term of this patent is extended or adjusted under 35 U.S.C. 154(b) by 996 days.

This patent is subject to a terminal disclaimer.

(21) Appl. No.: 11/522,723

(22) Filed: Sep. 18, 2006

(65) Prior Publication Data

US 2007/0121800 A1    May 31, 2007

Related U.S. Application Data

(63) Continuation-in-part of application No. 11/117,594, filed on Apr. 28, 2005, now Pat. No. 7,130,389.

(51) Int. Cl.
*H04M 11/04* (2006.01)

(52) U.S. Cl. .................... 379/37; 340/601; 370/352; 379/45; 379/79; 379/88.12; 379/88.19; 379/201.01; 455/404.1; 455/412.2; 725/33

(58) Field of Classification Search .......... 379/88.12, 379/88.22, 142.15, 37, 45, 79, 88.19, 201.01; 370/352; 340/601; 455/404.1, 412.2; 725/33
See application file for complete search history.

(56) References Cited

U.S. PATENT DOCUMENTS

| | | | |
|---|---|---|---|
| 5,694,019 A | 12/1997 | Uchida et al. | |
| 6,212,265 B1 * | 4/2001 | Duphorne | 379/142.15 |
| 6,404,880 B1 | 6/2002 | Stevens | |
| 6,442,241 B1 | 8/2002 | Tsumpes | |
| 6,463,462 B1 | 10/2002 | Smith | |
| 6,496,568 B1 | 12/2002 | Nelson | |
| 6,643,355 B1 | 11/2003 | Tsumpes | |
| 6,678,358 B2 | 1/2004 | Langsenkamp et al. | |
| 6,683,870 B1 | 1/2004 | Archer | |
| 6,697,477 B2 | 2/2004 | Fleischer | |
| 6,816,878 B1 | 11/2004 | Zimmers et al. | |
| 6,842,772 B1 | 1/2005 | Delaney et al. | |
| 6,871,214 B2 | 3/2005 | Parsons | |

(Continued)

*Primary Examiner*—Gerald Gauthier
(74) *Attorney, Agent, or Firm*—Buskop Law Group, PC; Wendy Buskop

(57) ABSTRACT

A digital notification and response system utilizes an administrator interface to transmit a message from an administrator to user contact devices having an advertising module and a customer module with translation abilities. The system comprises a dynamic information database that includes user contact data, priority information, and response data. The administrator initiates distribution of the message based upon grouping information, priority information, and the priority order. The message is transmitted through at least two industry standard protocols simultaneously to groups of user contact devices based upon priority information. Once the message is received by the user contact device, the user contact device transmits a response through the industry standard protocols back to the dynamic information database.

31 Claims, 6 Drawing Sheets

U.S. PATENT DOCUMENTS

| | | |
|---|---|---|
| 6,912,462 B2 | 6/2005 | Dodrill |
| 6,931,415 B2 | 8/2005 | Nagahara |
| 6,970,535 B2 | 11/2005 | Gregory et al. |
| 6,973,166 B1 * | 12/2005 | Tsumpes .................... 379/45 |
| 6,999,562 B2 | 2/2006 | Winick |
| 6,999,565 B1 | 2/2006 | Delaney et al. |
| 7,023,967 B1 * | 4/2006 | Andersson et al. ....... 379/88.12 |
| 7,042,350 B2 | 5/2006 | Patrick |
| 7,069,303 B2 | 6/2006 | Sikora et al. |
| 7,084,775 B1 * | 8/2006 | Smith ......................... 340/601 |
| 7,130,389 B1 * | 10/2006 | Rodkey et al. ........... 379/88.12 |
| 7,159,230 B2 * | 1/2007 | Manson et al. ................. 725/33 |
| 7,174,005 B1 * | 2/2007 | Rodkey et al. ........... 379/88.12 |
| 7,174,150 B2 * | 2/2007 | Shida ...................... 455/404.1 |
| 7,177,397 B2 * | 2/2007 | McCalmont et al. .......... 379/45 |
| 7,177,398 B2 * | 2/2007 | Meer et al. .................... 379/45 |
| 7,184,521 B2 | 2/2007 | Sikora et al. |
| 7,353,256 B2 | 4/2008 | Delaney et al. |
| 7,362,852 B1 * | 4/2008 | Rodkey et al. ........... 379/88.12 |
| 7,401,147 B2 | 7/2008 | Sikora, et al. |
| 7,409,428 B1 | 8/2008 | Brabec et al. |
| 7,412,225 B2 * | 8/2008 | Islam et al. ............... 455/404.1 |
| 7,418,085 B2 * | 8/2008 | Rodkey et al. ........... 379/88.12 |
| 7,440,442 B2 * | 10/2008 | Grabelsky et al. ........... 370/352 |
| 7,496,183 B1 * | 2/2009 | Rodkey et al. ........... 379/88.12 |
| 7,519,165 B1 * | 4/2009 | Rodkey et al. ........... 379/88.12 |
| 7,587,030 B2 * | 9/2009 | Blalock et al. ................. 379/37 |
| 7,627,091 B2 * | 12/2009 | Becker et al. .................. 379/37 |
| 7,627,092 B2 * | 12/2009 | Contractor ..................... 379/45 |
| 2002/0032020 A1 | 3/2002 | Brown |
| 2002/0095414 A1 | 7/2002 | Barnett et al. |
| 2002/0156759 A1 | 10/2002 | Santos |
| 2002/0159570 A1 | 10/2002 | Langsenkamp et al. |
| 2003/0186716 A1 | 10/2003 | Dorenbosch et al. |
| 2005/0013417 A1 | 1/2005 | Zimmers et al. |
| 2005/0031096 A1 * | 2/2005 | Postrel ..................... 379/88.22 |
| 2005/0232401 A1 * | 10/2005 | Ordille et al. ............ 379/88.22 |
| 2005/0242944 A1 | 11/2005 | Bankert |
| 2005/0272368 A1 | 12/2005 | Langsenkamp et al. |
| 2005/0272412 A1 | 12/2005 | Langsenkamp et al. |
| 2007/0041514 A1 * | 2/2007 | Rodkey et al. ................. 379/37 |
| 2007/0096894 A1 | 5/2007 | Lemmon |
| 2007/0121800 A1 * | 5/2007 | Rodkey et al. ................. 379/37 |
| 2008/0143548 A1 | 6/2008 | Grimmelmann et al. |
| 2009/0028303 A1 * | 1/2009 | Brunson et al. .......... 379/88.12 |
| 2009/0077045 A1 | 3/2009 | Kirchmeier et al. |
| 2009/0131088 A1 | 5/2009 | Kirchmeier et al. |
| 2009/0135008 A1 | 5/2009 | Kirchmeier et al. |
| 2009/0156240 A1 | 6/2009 | Kirchmeier et al. |

* cited by examiner

DIGITAL NOTIFICATION AND RESPONSE SYSTEM WITH REAL TIME TRANSLATION AND ADVERTISING FEATURES

FIELD

This patent application claims the benefit, under 35 USC §120, of the prior non-provisional application Ser. No. 11/117,594, which was filed Apr. 28, 2005. The present embodiments relate generally to the creation and delivery of messages, to the routing, and to the verification and collection of responses to the messages. The system and methods are universally applicable to, and independent of, the type of messaging system and device selected by the message recipients.

More particularly, the present embodiments relate to an immediate response information or emergency system.

BACKGROUND

Businesses and their employees are actively involved in sending and receiving information using a variety of messaging formats, systems, and message receiving devices. For example, a traveling employee might, in a single trip away from the office, receive messages sent by fax, pager, electronic mail (e-mail), and voice mail. In addition, the messaging devices by which these messages are actually received might include a pager, a cellular telephone, a paper fax machine, a voice mailbox, or a portable computer connected to the Internet or to a private local area network (LAN). Often these messages will vary in their level of importance, which could affect the delivery methods and/or the nature and timing of any needed response to the message.

For example, the arrival of an e-mail message from a particular sender might cause the recipient to fax a report in response. A message reporting a failure in a mission-critical computer system may need an immediate response from a maintenance technician that the message has been received and will be acted on. A message reporting a fire or other disaster may need to be sent simultaneously, or in a notification hierarchy, to multiple members of a disaster response team, with escalating methods of messaging and response gathering to insure that every team member has been notified and has responded in an appropriate fashion.

In some group messaging contexts, the post-message processing, organizing, and reporting of multiple message responses can be important in further decision making by the message originator.

The prior art methods implemented in commercially available unified messaging and device specific systems generally provide one-way delivery, with destinations defined by the sender. Unfortunately, prior art systems do not solve the need for originating a message, with attachment and response requirements, in a manner and format that is independent of the type of the device that is to be used for delivering the message to the recipients. Also, prior art systems do not permit the message notification methods to be defined by the recipients, and do not include a facility for automatic processing and organization of message responses. Accordingly, known e-mail, unified messaging and specific device systems using these prior art methods are deficient in responding to these requirements.

A need exists for a system and method for automating and escalating the delivery of messages and collection of message responses implemented through messaging devices of multiple types. The system needs to work in conjunction with recipient rules routing, verification of notification and response, and collection of responses in a predefined format.

A need exists for a digital information and response system to bridge the gap between the government and the public for communication without being limited to one device.

A need exists for a method of communication from an administrator which reaches all possible forms of communication devices, so that all members of the public can be reached.

A need exists for a system that can transmit a message in multiple languages to multiple user devices to inform the public of emergency situations, and general information simultaneously.

The present embodiments meet these needs.

BRIEF DESCRIPTION OF THE DRAWINGS

The detailed description will be better understood in conjunction with the accompanying drawings as follows.

Figure 1:
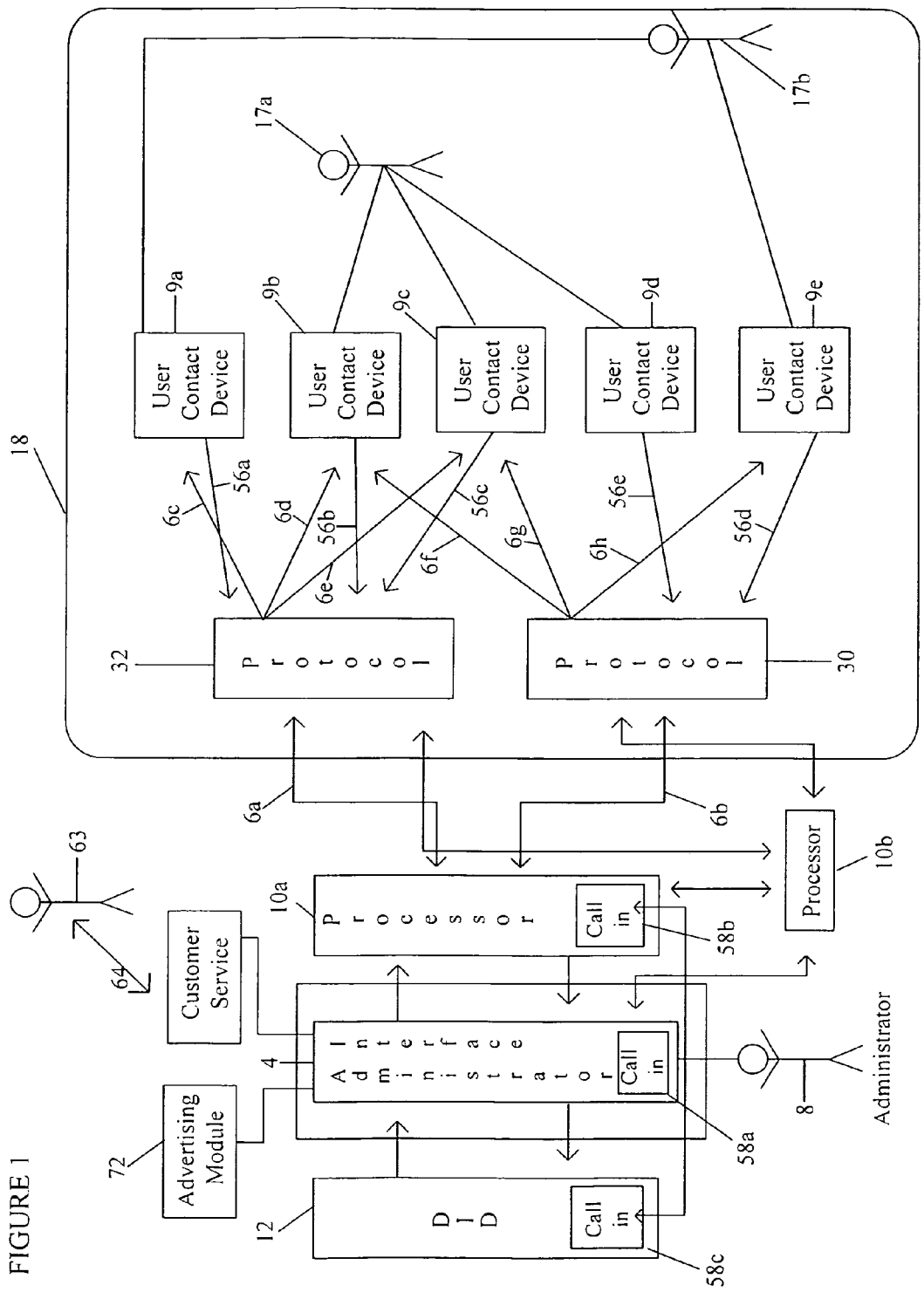
FIG. 1 depicts a representation of an embodiment of a digital notification and response system.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that the invention can be practiced or carried out in various ways.

The present embodiments relate to an immediate response information or emergency system. The present embodiments relate to the creation and delivery of messages, and to the routing of messages, and to the verification and collection of responses to the messages. The system and methods are universally applicable to, and independent of, the type of messaging system and device selected by the message recipients. The present embodiment relates to the simultaneous transmission of a message in multiple languages to a user device, wherein the recipient of the message selects the language for transmission to the recipient.

The embodied immediate response information systems provide a timely and uniform manner to contact numerous users through numerous user contact devices, such as a cell phone, a television, a light emitting diode (LED) display, a land phone line, an e-mail address, a fax machine, a pager, a digital display, an other similar devices, and handheld wireless device, including personal digital assistants (PDAs) and Blackberries™.

The system is used to contact users in the case of emergency conditions, such as storms or fire; and in the case of informational situations, such as school closings. Additionally, terrorist threat levels can be transmitted using this system. The system can be used to advise office building superintendents and users in the buildings, concerning building condition updates, parking garage conditions, and vehicle conditions.

The systems can be used for the sports industry, such as children's soccer or Major League Baseball games, wherein the systems can be used to update fans on changed game times and weather conditions that affect a game start. The systems can also be used to update status of wins and losses on a "real time" basis to user contact devices.

The present embodiments provide a system that has a high speed notification and response system in which information is accessed and stored in a dynamic information database. The systems can be set to contact users automatically when specific conditions arise or to contact a user or groups of users when initiated by an administrator. The systems can be set to contact a large number of users in a systematic manner based upon priority order.

The present embodiments can be used save lives because the system can notify large groups of individuals concerning very dangerous situations quickly and to many different devices. The system can be used to stop rumors that a situation is safe. The system can stops panic and chaos, because the system can send a consistent message to all users on the system.

The embodied immediate response information systems provide other benefits, such as general information update, which are not emergency situations. For example, a message can be sent such as "bring a flower to your teacher tomorrow because it is her birthday" to all the parents of students of a second grade class using the system.

With reference to the figures, FIG. 1 examples an embodiment of a digital notification and response system usable with a network 18, wherein an administrator 8 can transmit one or more messages 6a and 6b to one or more user contact devices 9a, 9b, and 9c using an administrator interface 4. An example of a messages can be "a bomb threat has occurred and the airport must be evacuated."

The administrator 8 can be a person, a computer, an agency, an analog notification system, another digital notification and response system, a governmental agency, or combinations of these entities.

The administrator 8 can interact with the administrator interface 4 to begin the process of sending one or more messages, which are shown in FIG. 1 as 6a, 6b, 6c, 6d, 6e, 6f, 6g, and 6h to one ore more user contact devices 9a, 9b, 9c, 9d, and 9e.

The administrator interface 4 can be a local area network interface, a wide area network interface, a virtual private network interface, asynchronous transfer mode interface, a synchronous optical network interface, a call center, a voice mail, or other similar means to transmit a message to numerous contacts.

The message can be a text message, a numerical message, one or more images, or a combination of these. The message can be encoded.

The message can include a designation that identifies the importance of the message. Examples of these designations include low priority, general priority, significant priority, high priority, and severe priority. The designations can coincide with the Homeland Security's five-color system. For example, the designations can be color-coded, such as green for a low priority message, blue for a preparedness message or general priority message, yellow for a cautionary message such as a significant priority, orange for an emergency message or high priority message, or red for a critical message with a severe priority. The priority levels can be customized to incorporate different levels of emergencies, or they can be tailored to standards for a particular industry, like building owners and managers standards codes for risks or emergencies in a building.

As seen in FIG. 1, the message is then transmitted to various devices. The message is formed by an administrator 8 at the administrator interface 4 using data from the dynamic database (DID) 12 using at least one processor, shown in FIG. 1 as two linked processors 10a and 10b, a "processor cluster" to transmit the message or messages through at least two standard industry protocols 30 and 32, simultaneously, which are part of a network 18 having at least one or more user contact devices 9a, 9b, 9c, 9d, and 9e which are controlled by one or more users 17a and 17b.

The users can be individuals or entities that can receive a message, send a message, respond to a message, receive more than one message, respond to more than one message, or combinations of these activities.

Users of the system can be an entire establishment or an entire organizations, such as a company, employees of company, an individual, a parent of a child, a fire and police department, a coach of a youth sports team, a team manager of a youth sports team, the manager of a major league sports team, sports team representative, a mom or dad of a sports team player, a commercial property manager, a school system, an adult, a security company, a restaurant, a hotel, or combinations thereof.

Examples of usable user contact devices include handheld wireless devices, wireless phones, land phones, e-mail addresses, digital displays, an light emitting diode (LED) display, fax machines, pagers, and similar devices that capable of receiving a message. Examples of a handheld device includes a personal digital assistant (PDA), a Blackberry™, or a cellular phone.

The message(s) 6a, 6b, 6c, 6d, 6e, 6f, 6g, through 6h can be stored in the dynamic information database 12.

The message can be a prewritten message stored in the database for subsequent use by the administrator 8 or can be generated from the dynamic information database 12 by the administrator creating a custom message based upon inputs from the administrator.

The message can be given a designation which can be textual, color coded, imaged with an icon, animation, or combinations thereof. If textual, it can read, low priority, general priority, significant priority, high priority and severe priority. The color coded designation can be a color associated with a priority, like red for severe priority, green for low priority. The message can contain an image or icon, which the user can pre-select to represent the priority of the message, such as an exclamation point for emergencies. The messages and priority codes can be prewritten and stored in the dynamic information database 12 for subsequent use of the administrator.

Once the message has been received by the one or more user contact devices, a response can be transmitted from those contact devices that the message has been received. The responses 56a, 56b, 56c, 56d, and 56e can be sent back through the two industry standard protocols 30 and 32 simultaneously to the processor or linked processors 10a and 10b and stored in the dynamic information database 12.

The response from the user of the network can be an audio file or a dual tone multi-frequency tone (DTMF).

In addition, a customer server interface 64 can be in communication with the administrator interface 4. The customer server interface 64 can have a GUI interface connected to a network for use by a customer service support representative 63 to assist users with the system. The interface can contain text boxes of instructions. The same interface can have the dual advantage of being able to send out alerts as well, providing a redundancy in case the primary administrator interface fails.

An advertising module 72 can be in communication with the administrator interface 4. The advertising module can enable an advertiser to place ads in association with a message for transmission. The ads can be stored in the dynamic information database 12. The advertising module is usable to hold audio files, images files, video files, such as banner ads of a advertiser and place the ads before or after a message as a method to enable users to self fund implementation of the system.

The advertising module 72 can be used to insert header and footer files in the message to personalize the message to the group of users to whom the message is addressed.

FIG. 1 also shows the call in feature which enables users to call in and retrieve previously sent messages and receive updates. In one embodiment, the call in feature 58a can be contained in the administrator interface (shown in FIG. 3). In another embodiment the call in feature 58b can be contained in one of the processors of the system. In still another embodiment, the call in feature 58c can be contained in the dynamic information database. In yet another embodiment the call in feature can be in one or all of these components of the system.

Figure 2:
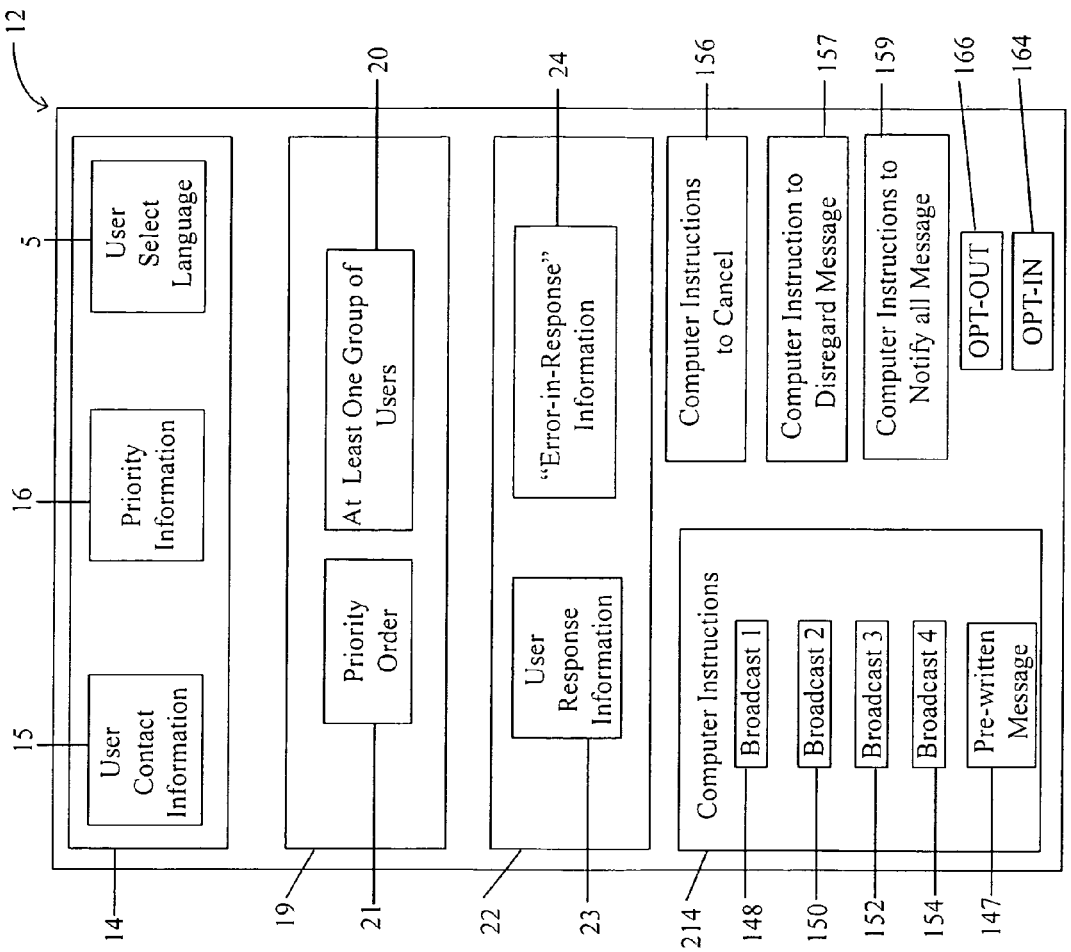
FIG. 2 depicts a representation of an embodiment of a dynamic information database associated with a digital notification and response system.

FIG. 2 shows a schematic of the dynamic information database 12. The dynamic information database includes user contact data 14, which includes user contact information 15, and priority information 16. In another embodiment of the invention the user contact data 14 can include a user selected language 119, such as Spanish for the message.

The user contact information 15 can include an e-mail address, a user device internet protocol (IP) address, and combinations thereof. Each user contact device can include information that can be unique to each individual user contact device or can include information that can be common to all user contact devices. For example, a serial number for a cell phone, a Mac address for an Ethernet card and so on.

The user priority information includes the order that the user wants the user devices contacted in, such as a particular user Blackberry™ first, and then a cell phone second, and then a home phone third, and then e-mail fourth. However, all messages can go out simultaneously to all devices, if needed.

Additionally the dynamic information database 12 contains grouping information 19 which includes at least one group of users 20. For example the group of users can be Fema, employees, or users of a defined geographic area, such as Houston 100 year flood zone inhabitants.

In an embodiment, the grouping information may have a priority order 21.

The priority order 21 directs the administrator interface 4 to contact a first group of contact devices, for this example, a user contact device indicated as a first contact. After all of the contact devices in the first contact have received the message, the priority order directs the administrator interface to contact a second group of user contact devices, for this example, the user contact device indicated as a second contact. Then, the administrator interface continues to relay messages to contact devices based on the priority order until all contact devices are reached and a response is provided from the contact devices. The priority order of the user devices is selected by the user.

The dynamic information database can further include response data 22, as shown in FIG. 2, which can be transmitted from the contact devices back through at least the two standard industry protocols 30 and 32, simultaneously through the processors 10a and 10b, to the dynamic information database 12.

The response data provides information on whether the contact devices received the message. The response data 22 can include user response information 23 that indicates the user device has received the message or "error-in-response" information 24 that indicates the user device has not received the information perhaps because contact information was insufficient and the message can not be delivered properly. The "error in response" information 24 can also indicate that an email address, phone number, or contact device is simply invalid.

FIG. 2 also shows that the dynamic information database 12 (DID) can further include computer instructions 214 to enable the processor to broadcast at a future time, a message on a specific date and time 148, such as a broadcast on Monday, Aug. 8, 2006 at 5:55 pm, or broadcast the message a predetermined periodic intervals 150, such as every Tuesday in the month of August at 7:00 am.

The dynamic information database can include computer instructions to broadcast the message to a defined geographic area 152 and computer instructions to broadcast the message to select wireless devices 154.

The broadcasts can be using prewritten messages 147 or custom designed messages.

The dynamic information database also includes computer instructions enabling the administrator to cancel a message 156 in progress or a message scheduled for delivery at a future date and time. These computer instructions 157 enable administrators to transmit a "disregard" message notification for users that received the message while administrators cancel messages in progress.

In an embodiment, the DID includes computer instructions for notifying the administrator when all messages have been delivered to the target users 159.

In an embodiment the DID can have computer instructions allowing users to opt-in to the system 164 allowing users to receive messages from the system.

In an embodiment the DID can include computer instructions providing an opt-out to the system 166 permitting one or more users to opt-out from receiving messages. Therefore, the user can opt-in to gain the service or opt-out to remove themselves from receiving further messages.

The dynamic information database 12 can be an SQL™ database, a MySQL™ database or other industry standard databases, an Oracle™ database, or other similar database that can organize information in a similar manner.

The industry standard protocols can be a Megaco/H.248 protocol, simple message transfer protocol (SMTP), a short message service protocol (SMS,) a multimedia message service protocol (MMS), an enhanced message service protocol (EMS), a media protocol control protocol (MGCP), a SIP protocol, a H.323 protocol, and ISDN protocol, a PSTN protocol, and combinations thereof.

Figure 3:
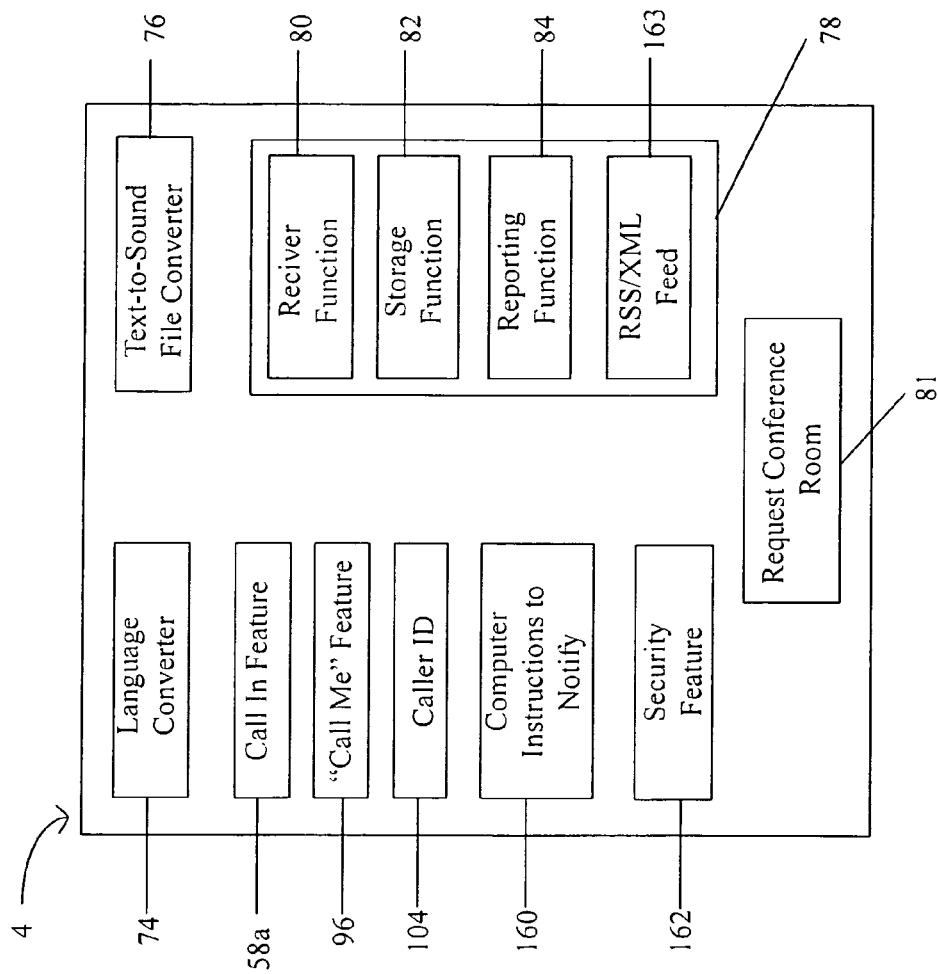
FIG. 3 depicts the administrator interface associated with a digital notification and response system.

FIG. 3 shows the components of the administrator interface 4. The administrator interface 4 has a "call in" feature 58a enabling an administrator 8 to call the digital notification and response system to send a message to at least one user contact device on the network. The "call in" feature 58, is shown located in one or more devices; "call in" feature 58a can be in the administrator interface 4, "call in" feature 58b can be in one of the processors 10a, and "call in feature" 58c can be located in the dynamic information database 12.

The administrator interface 4 also has a language converter 74 for translating the message to be transmitted into a user selected language. The administrator interface 4 can have a text-to-sound file converter 76 for translating the message from text to a sound file. The translator, such as a Systran™ translator module. The text to sound file converter, such as Microsoft Speech Server™.

The administrator interface 4 can include a responder module 78 which can include a receiver function 80, for receiving responses from the user device that reply to the message. The responder module can include a storage function 82 for recording the received responses in dual-tone-multiple frequencies (DTMF) or interactive voice response (IVR) format in the dynamic information database 12. The responder module can include a reporting function 84 for creating reports 200 (shown in FIG. 4) using the received responses.

The responder module can also include a "really simple syndication" (RSS)/XML "extensible mark up language" feed 163 from a reliable source, such as CNN news, and the feed can be pushed out to the user devices from the processor that receives the feed 163.

The administrator interface 4 can further include computer instructions enabling an administrator to request an electronic "conference room" 81 that can be entered by users of the system.

The administrator interface 4 can further include computer instructions for notifying the administrator when all messages have been delivered to the target users 160.

In an embodiment, the administrator interface can have a security feature 162 for controlling access to the system. The security feature can allow for security access, which is not shown, by using a bar code reader, a radio frequency identification device "RFID" tag reader, a scannable badge reader, a security token, a smart card reader, a biometric reader, magnetic card reader, and combinations thereof.

Additionally the administrator interface 4 can have a computer instructions that provide a "call me" feature 96. The "call me" feature enables an administrator 8 to compose a message to send out to a user or groups of users of a network.

Also, the administrator interface 4 can include a "caller ID" feature 104 enabling a user to call a number, use an account code, obtain messages previously transmitted to that user, and update messages currently being transmitted to the user.

Figure 4:
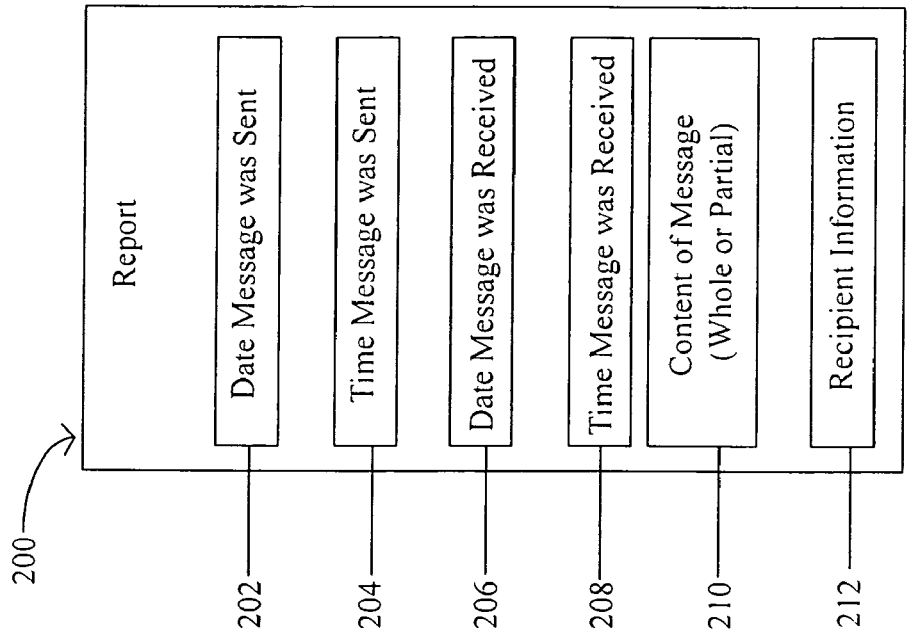
FIG. 4 depicts a representation of an embodiment of a report associated with a digital notification and response system.

FIG. 4 depicts an embodiment of a responder module which can be used to create reports 200. The report can include a date the message was sent 202, a time the message was sent 204, a date the message was received 206, a time the message was received 208, content of the message, which can be in part or the whole message 210, recipient information of the message 212, and combinations of these elements. The reports can be generated by the administrator, a user, or both.

Other examples of information that can be included on a report are the names of the person who received the message, a copy of any voice mails transmitted with the message or associated with a particular message, a time when an e-mail message was read, the time when a fax was printed by the user. The report can be transmitted to users of the network, requesting a second response from at least one user of the network The administrator can create custom designed reports, or standard reports can be generated from the dynamic information database for use by the administrator.

The administrator interface can be a local area network web interface, a wide area network web interface, virtual private network interface, a synchronous transfer mode interface, a synchronous optical network interface, a call center interface, a voice mail, or combinations thereof.

Figure 5:
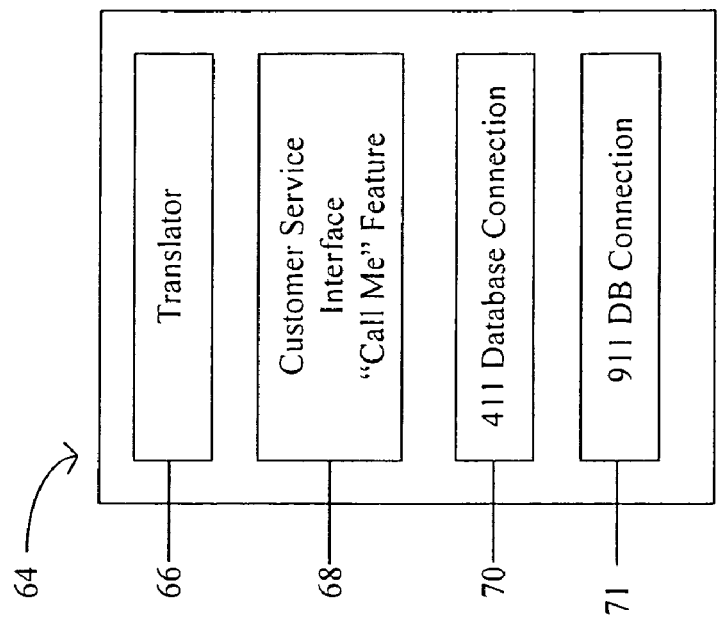
FIG. 5 depicts the customer service interface associated with a digital notification and response system.

FIG. 5 shows a diagram of the customer service interface 64 which can have a translator 66, such as an individual that can speaks multiple languages, a customer service interface "call me" feature 68, a 411 database connection 70, a 911 database connection for users of the network 71. The call me feature can have one or more of these elements and be usable herein.

Figure 6:
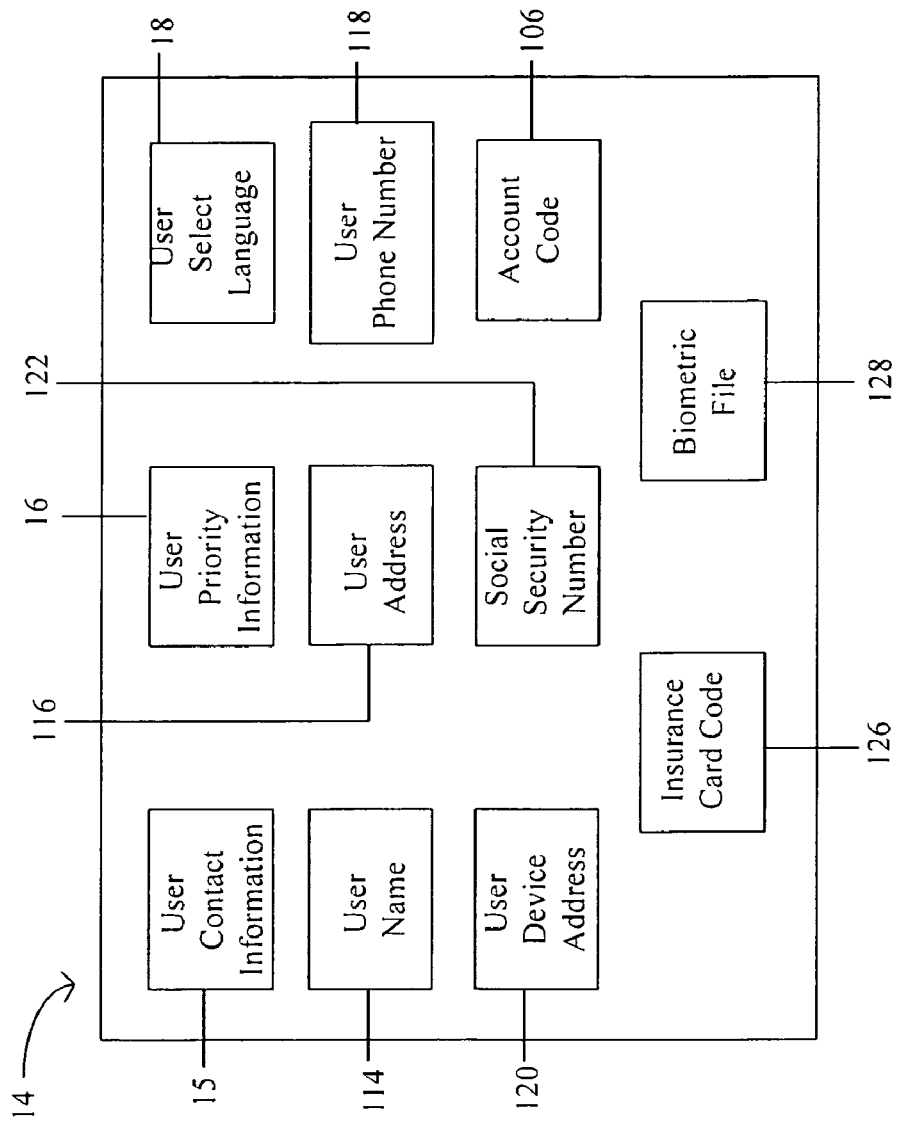
FIG. 6 depicts user contact data associated with a digital notification and response system.

FIG. 6 shows a diagram of user contact data 14 resident in the dynamic information database 12. The user contact data can include user contact information 15, priority information 16, and a user selected language 5 for the messages.

The user selected language 5 for the message can be languages such as, Chinese, Dutch, English, French, German, Italian, Japanese, Korean, Norwegian, Portuguese, Russian, Spanish, Swedish, Vietnamese, or other additional languages.

The priority information 16 indicates a contact order for various user contact devices. The contact order can be used to direct the order in which the dynamic information database transmits a message to the user contact devices.

The priority information 16 can also contain a priority order that directs the administrator interface to contact a first group of user contact devices indicated as a first contact. After all of the user contact devices in the first contact have received the message, the priority order directs the administrator interface to contact a second group of user contact devices indicated as a second contact. The administrator interface then continues to contact user contact devices based on the priority order until all user contact devices are reached and a response is provided from the user contact devices.

The user contact data 14 can include information associated with the user of the user contact device.

FIG. 6 depicts the user contact data having a user name 114, a user address 116, a user phone number 118, a user device address 120, a user social security number 122, an account code 106, an insurance card code 126, a biometric file 128, and combinations thereof. The contact data can be used by the user to obtain updates to the message by calling into the network.

The administrator can initiate a distribution of one or more messages. The system can be initiated automatically. Fire and burglar alarms when set off, can automatically alert the system, and then the system can automatically advise a user.

The embodiments have been described in detail with particular reference to certain preferred embodiments, thereof, but it will be understood that variations and modifications can be effected within the scope of the embodiments, especially to those skilled in the art.

What is claimed is:

1. A digital notification and response system for preparing and transmitting at least one message from an administrator using at least one processor to at least one user on a network, wherein each user of the network has at least one user contact device, wherein the system comprises:
   a. an administrator interface for transmitting a message from an administrator to at least one user contact device;
   b. a dynamic information database for preparing the message for transmission, wherein the dynamic information database comprises:
      i. user contact data comprising user contact device information; and
      ii. user selected grouping information comprising at least one group associated with each user of the network; and
      iii. response data comprising user response information that indicates the at least one user contact devices have received the message; and
   wherein the administrator initiates preparation and distribution of at least one message to the network using the user selected grouping information and wherein the message is transmitted through at least two industry standard protocols simultaneously, and the message is received by the at least one user contact device in the network, and the at least one user contact device transmits a response through the industry standard protocols to the dynamic information database.

2. The system of claim 1, wherein the system further comprises a "call in" feature embodied in the administrator interface, the processor or the dynamic information database enabling an administrator to call the digital notification and response system to send a message to at least one user contact device on the network.

3. The system of claim 1, wherein the system further comprising a customer service interface in communication with the administrator interface, wherein the customer service interface comprises:
   a. a translator;
   b. a customer service representative interface "call me" feature";
   c. a 411 database connection for users of the network; or
   d. a 911 database connection for users of the network.

4. The system of claim 1, wherein an advertising module is in communication with the administrator interface enabling individual advertisers to place ads in conjunction with the message.

5. The system of claim 1, wherein user contact data further comprises a user selected language for translating the message to be transmitted.

6. The system of claim 1, wherein the administrative interface further comprises a language converter for translating the message to be transmitted into a user selected language.

7. The system of claim 1, wherein the administrative interface further comprising a text-to-sound file converter for translating the message from text to a sound file.

8. The system of claim 1, further comprising a responder module within the administrator interface, wherein the responder module comprises:
   a. a receiver function for receiving responses from the user which reply to the message;
   b. a storage function for recording the received responses in DTMF or IVR format in the dynamic information database;
   c. a reporting function for creating at least one report using the received responses; or
   d. a combinations thereof.

9. The system of claim 8, wherein the reporting function includes computer instructions to form a report consisting of: a date the message was sent, a time the message was sent, a date the message was received, a time the message was received, a content of the message, a recipient information, and combinations thereof.

10. The system of claim 1, wherein the administrator interface is a local area network web interface, a wide area network web interface, a virtual private network interface, a synchronous transfer mode interface, a synchronous optical network interface, a call center interface, a voice mail, or combinations thereof.

11. The system of claim 1, wherein the administrator interface comprises a "call me" feature.

12. The system of claim 1, wherein the administrator is a person, a computer, a government agency, another digital notification and response system, an analog notification system, and combinations thereof.

13. The system of claim 1, wherein the administrator interface comprises a "caller ID" of users enabling the user to call a number and use an account code to obtain a menu of messages for that user.

14. The system of claim 1, wherein the message comprises a designation selected from the group: low priority, general priority, significant priority, high priority, and severe priority.

15. The system of claim 14, wherein the designation comprises a color, icon, animation or combination thereof, associated with the priority.

16. The system of claim 1, wherein the message is a pre-written message stored in the dynamic information database for subsequent use by the administrator.

17. The system of claim 1, wherein the dynamic information database is a SQL™ database, a MySQL™ database, other industry standard databases, an Oracle™ database, or combinations thereof.

18. The system of claim 1, wherein the industry standard protocol is selected from the group consisting of a Megaco/H.248 protocol, a simple message transfer protocol (SMTP), a short message service protocol (SMS,) a multimedia message service protocol (MMS), an enhanced message service protocol (EMS), a media protocol control protocol (MGCP), a SIP protocol, a H.323 protocol, a ISDN protocol, a PSTN protocol, and combinations thereof.

19. The system of claim 1, wherein the user contact data is a member selected from the group consisting of: a user name, a user address, a user phone number, a user device address, user social security number, an account code, an insurance card code, a biometric file, user selected language, and combinations thereof.

20. The system of claim 1, wherein the user contact data can be used by a user to obtain updates to the message.

21. The system of claim 1, wherein the user contact device is a handheld wireless device, a wireless phone, a land phone, an email address, a fax machine, a pager, a digital display, a light emitting diode (LED) display, or combinations thereof.

22. The system of claim 8, wherein the report is messaged to users of the network, requesting a second response from at least one user of the network.

23. The system of claim 1, wherein the response from the user of the network is an audio file or a dual tone multi-frequency tone (DTMF).

24. The system of claim 1, wherein the database further comprises computer instructions enabling a processor to (a) broadcast a time based message at a specific date and time, (b) broadcast the message at predetermined periodic intervals, (c) broadcast the message to a defined geographic area, (d) broadcast the message to select wireless devices, or combinations thereof.

25. The system of claim 24, wherein the database further comprising computer instructions enabling the administrator to cancel a message in progress or cancel a message scheduled for delivery at a future date and time.

26. The system of claim 25, wherein the dynamic information database further comprises computer instructions enabling administrators to transmit a "disregard" message notification for users that received the message while administrators cancel messages in progress.

27. The system of claim 1, wherein the dynamic information database further comprising computer instructions for notifying the administrator when all messages have been delivered to the user contact devices.

28. The system of claim 1, wherein the administrator interface has a security feature for accessing the system, and wherein the security access is selected from a member of the group consisting of: a bar code reader, a radio frequency identification device "RFID" tag reader, a scannable badge reader, a security token, a smart card reader, a biometric reader, magnetic card reader, and combinations thereof.

29. The system of claim 1, wherein the dynamic information database further comprises computer instructions allowing a user to opt-in or opt-out of the network.

30. The system of claim 1 wherein the user contact data further comprises user priority information indicating a user defined priority order for contacting groups in the system.

31. The system of claim 1, wherein the response data further comprises "error-in-response" information that indicates insufficient user contact device information existed to contact the at least one user contact device.

* * * * *